(12) United States Patent
Turfait et al.

(10) Patent No.: US 8,500,172 B2
(45) Date of Patent: Aug. 6, 2013

(54) DOUBLE COVER-CENTER CUSHION DECOUPLER

(75) Inventors: Thomas Turfait, Atlanta, GA (US); Rolf Janssen, Atlanta, GA (US); Eric Barbely, Decatur, GA (US)

(73) Assignee: American BOA, Inc., Cumming, GA (US)

( * ) Notice: Subject to any disclaimer, the term of this patent is extended or adjusted under 35 U.S.C. 154(b) by 0 days.

(21) Appl. No.: 12/464,285

(22) Filed: May 12, 2009

(65) Prior Publication Data

US 2009/0309355 A1 Dec. 17, 2009

Related U.S. Application Data

(60) Provisional application No. 61/052,661, filed on May 13, 2008.

(51) Int. Cl.
  *F16L 21/00* (2006.01)
(52) U.S. Cl.
  USPC ............................................ 285/226; 285/49
(58) Field of Classification Search
  USPC .................. 285/227, 228, 50, 48, 49, 226
  See application file for complete search history.

(56) References Cited

U.S. PATENT DOCUMENTS

| | | | | |
|---|---|---|---|---|
| 4,659,117 A | * | 4/1987 | Holzhausen et al. | 285/49 |
| 4,893,847 A | * | 1/1990 | Hess | 285/226 |
| 4,911,482 A | * | 3/1990 | Doat | 285/226 |
| 5,083,817 A | * | 1/1992 | Holzhausen et al. | 285/49 |
| 5,090,746 A | * | 2/1992 | Holzhausen | 285/226 |
| 5,511,828 A | * | 4/1996 | Kurek et al. | 285/49 |
| 5,775,737 A | * | 7/1998 | Morgner et al. | 285/49 |
| 5,791,697 A | * | 8/1998 | Godel et al. | 285/300 |
| 5,967,565 A | * | 10/1999 | Kim | 285/49 |
| 5,971,439 A | * | 10/1999 | Cwik | 285/49 |
| 6,164,703 A | * | 12/2000 | Kim | 285/49 |
| 6,296,282 B1 | * | 10/2001 | Burkhardt et al. | 285/49 |
| 6,464,258 B2 | * | 10/2002 | Shin | 285/49 |
| 6,902,203 B2 | * | 6/2005 | Kang | 285/226 |
| 2004/0178628 A1 | * | 9/2004 | Laubie | 285/226 |

FOREIGN PATENT DOCUMENTS

| | | | |
|---|---|---|---|
| DE | 3932834 A1 | * | 4/1991 |
| DE | 4401827 A1 | * | 8/1994 |
| JP | 04331891 A | * | 11/1992 |

* cited by examiner

*Primary Examiner* — Aaron Dunwoody
(74) *Attorney, Agent, or Firm* — Wood, Herron & Evans, LLP

(57) ABSTRACT

A sealed coupling for connecting two pipe ends include two operating covers for respective connection to respective pipe ends, and elongated bellows having respective ends and a damping element supported by respective rims of said covers, said damping element disposed radially outwardly of said bellows and oriented centrally of said respective bellows ends for dissipating forces on said coupling uniformly across said bellows.

10 Claims, 3 Drawing Sheets

DOUBLE COVER-CENTER CUSHION DECOUPLER

RELATED APPLICATION

Applicant claims the priority of U.S. provisional patent application Ser. No. 61/052,661, filed May 13, 2008 and entitled, "DOUBLE COVER-CENTER CUSHION DECOUPLER", which application is incorporated herein by reference.

FIELD OF THE INVENTION

This invention relates to the field of piping and more particularly to flexible couplings for coupling pipe ends one to another compensating for, dissipation of and suppressing transfer of thermal influences, pressure changes, motion such as torsion or bending, noise, vibration and harshness (NVH) and other concerns.

BACKGROUND OF THE INVENTION

Known flexible couplings for piping systems have an inherent disadvantage in that they place or locate major damping elements in non-uniform locations, usually at the extremities or extreme ends of the coupling device. Where prior coupling joints, which use flexible sealing bellows, have effective pivot points (such as at the damping elements), the result is an off-center or asymmetric stress point or region which is not distributed evenly across the bellows geometry. This results in high, localized stress concentrations. Such higher stress concentrations typically require a longer bellows geometry which undesirably increases the overall length of the joint or coupling.

It is thus desired to provide damping apparatus in a piping system for evenly distributing system stress, and diluting stress concentration.

Another objective is to provide an elastic bellows coupling of widely dissipated stress concentration and of shorter length than heretofore available.

SUMMARY OF THE INVENTION

To these ends, one embodiment of the invention contemplates a central damper orientation in a bellows connector or coupler. This provides higher durability, shorter overall length, and a reduced number of components when compared to prior devices.

The higher durability advantage is achieved through the distribution of the stress more evenly over all convolutions of the bellows. This is achieved from the reduction in length of the effective moment arm created by the natural pivot of the damping element.

The stress reduction allows for fewer convolutions to be required per a given application. This, in turn, reduces the overall length of the joint. Also, orienting the damping element outside of the bellows, instead of at the end extremity, allows shorter overall coupling length.

The reduction of components is achieved by covers serving dual structural purposes and damping element retention. Therefore less metal forming and welding, or other assembly processes, are required as compared to prior devices.

The integral parts of a coupling according to the invention allow for a gas tight flexible connection that is capable of compensating and performing the benefits of compensating thermal influences, pressure changes, motion such as bending and torsion, noise vibration and harshness (NVH), and other such concerns.

These and other objects and advantages will become readily appreciated from the following written description and from the drawings, in which:

DETAILED DESCRIPTION OF THE INVENTION

It should be readily understood that the components and steps of the invention, as generally described and illustrated in the Figures herein and accompanying text, can be arranged and designed in a wide variety of different configurations while still utilizing the inventive concept. Thus, the following more detailed description of the preferred embodiments of the system and method for the present invention, as presented in the Figures and accompanying text, is not intended to limit the scope of the invention, but it is merely representative of the presently preferred embodiments thereof.

The preferred embodiments of the invention will be best understood by reference to the drawings wherein like parts or steps are designated by like numerals throughout.

Figure 1:
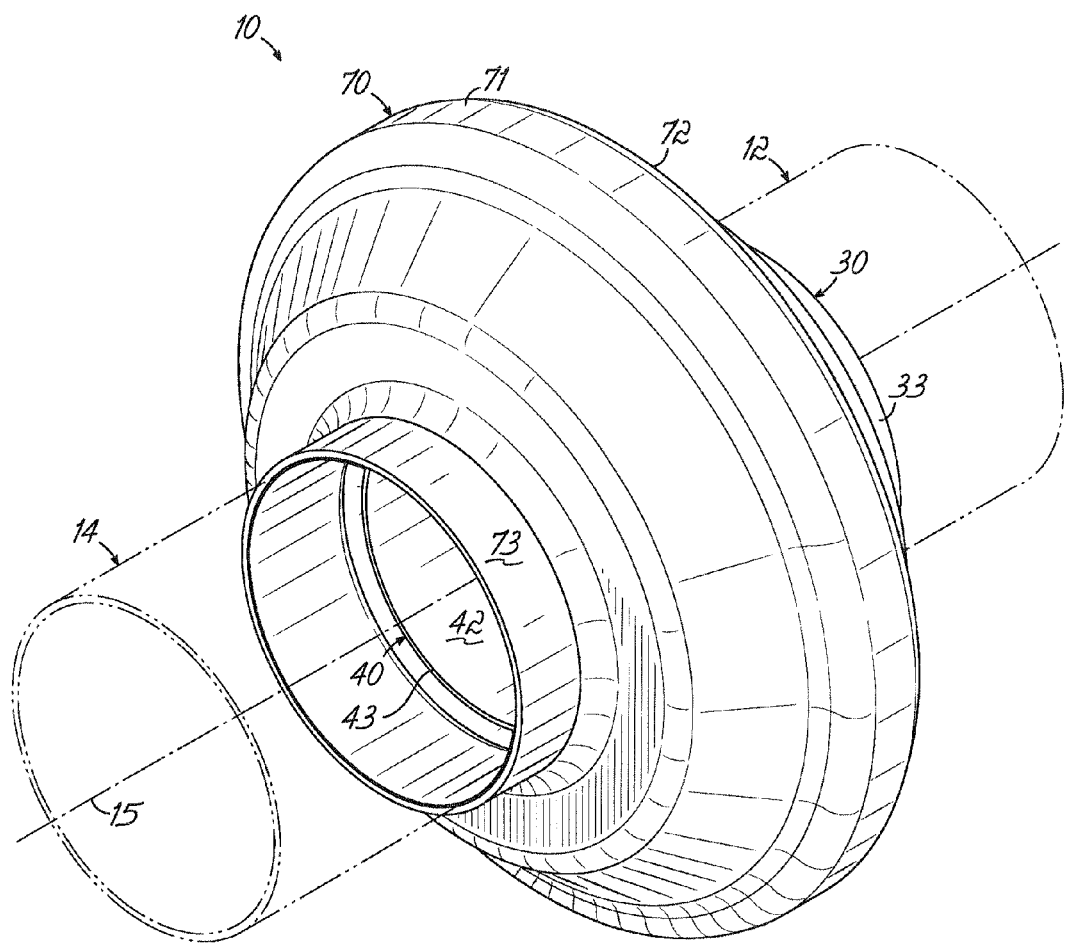
FIG. 1 is an isometric view of invention shown in an automotive exhaust application.
Figure 3:
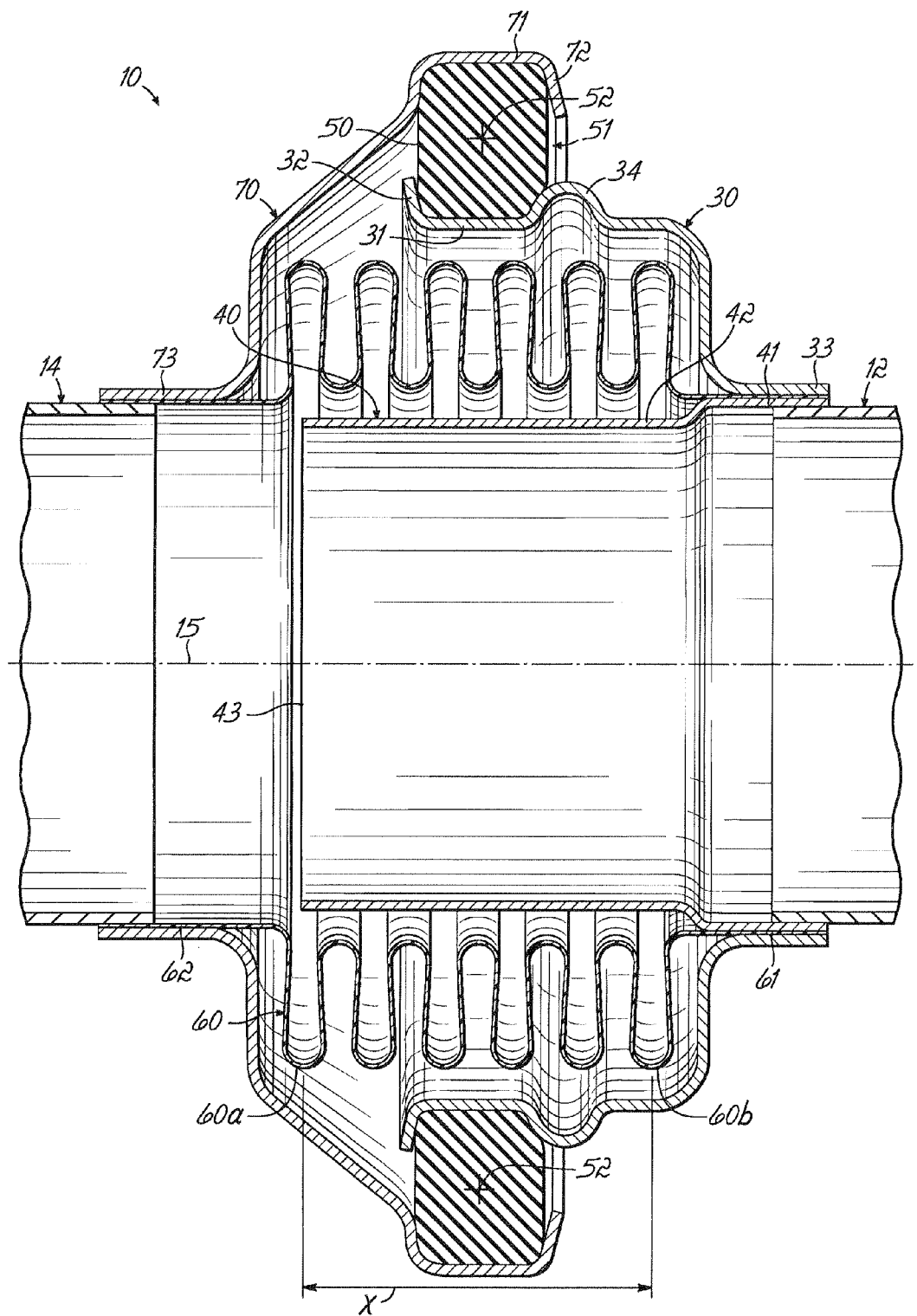
FIG. 3 is a cross-sectional view of the embodiment of FIG. 1 displaying the position of the damping element in relation to the bellows and other components of the invention including two covers supporting the location of the damping element. The components shown are generally symmetrical about an illustrative center line.

Turning now to the drawings, FIG. 1 illustrates one embodiment 10 of the invention in the environment of an internal combustion automotive exhaust system having two exhaust gas pipes 12, 14 (shown in phantom) and one of which, for example, may be an exhaust manifold. Coupling 10 may be used in other environments and with other pipes as is apparent. In this description, it will be appreciated that pipes 12, 14 are generally oriented co-axially with axis 15 (FIG. 3) of coupling 10, although coupling 10, among other things, may compensate for positional misalignment. This particular FIG. 1 illustrates the coupling 10 installed via press-fit or via welding. An alternative installation method is by fasteners through a flange. Other installation and assembly expedients may be used.

Figure 2:
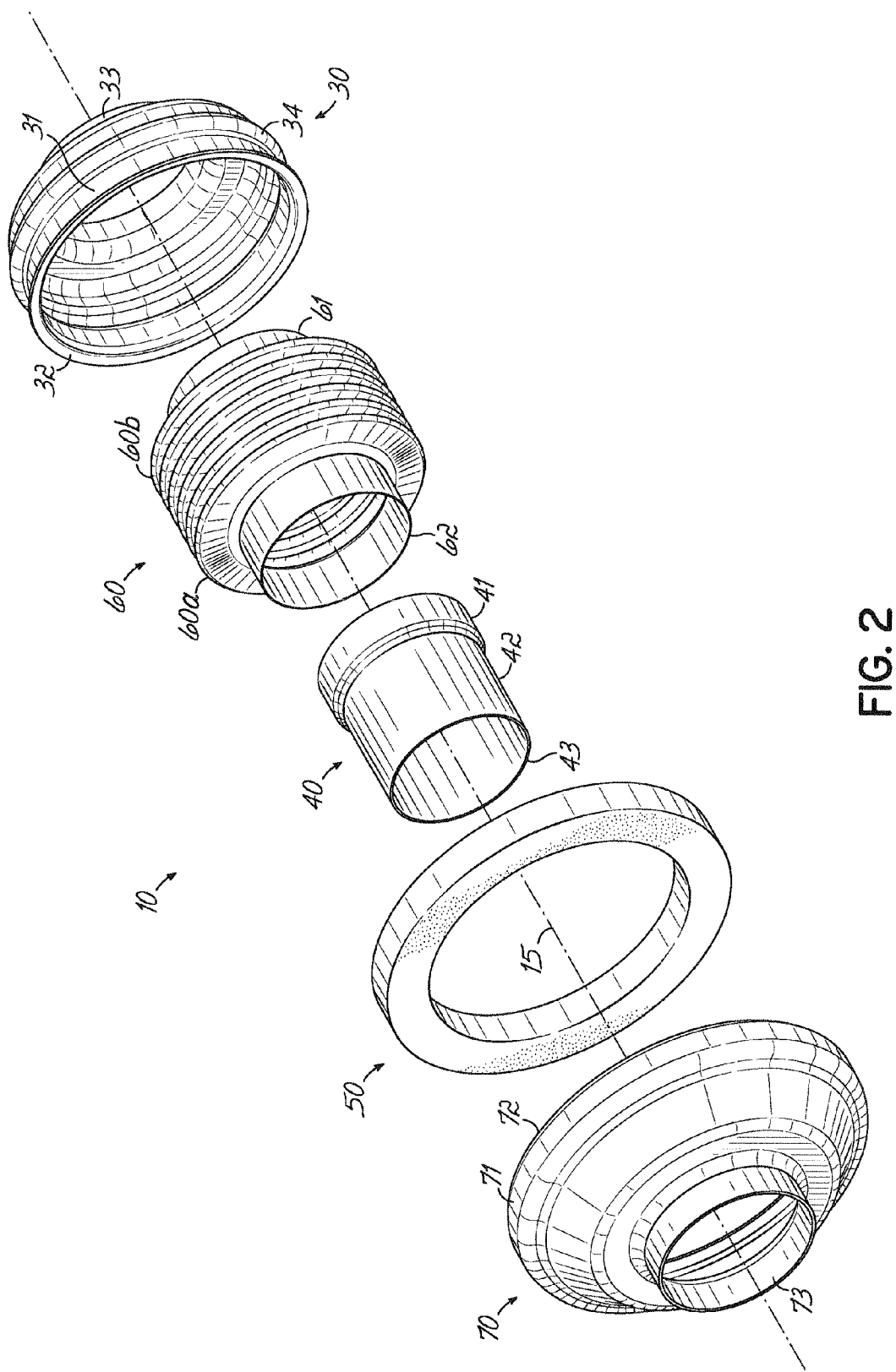
FIG. 2 is an exploded view of the embodiment of the invention illustrating components of one embodiment of the invention in expanded format for clarity of description.

Referring to FIG. 2, an exploded view displaying various components of the invention is shown. These include an inner cover 30, inner tube 40, damping element 50, bellows 60 and outer cover 70. These components are preferably nested or are interrelated to each other in the orientation and positions shown in FIG. 3 which illustrates the assembled components of the invention in cross-section. The damping element or annulus 50, made of any suitable damping material, is substantially centered in relation to the bellows 60. Thus, the convolutions 60a, 60b at each end of the bellows 60 are spaced apart over a distance x as shown. The center or effective center of mass 52 of damping element 50 is disposed a distance x/2 from each of the ends, in a preferred embodiment as shown.

One feature of the invention is the use of the inner cover 30 and outer cover 70 to centrally locate and capture the damping element 50 with respect to the bellows 60. By utilizing the structural/protective inner cover 30 and outer cover 70 to also locate the damping element 50, the quantity of components is reduced when compared to prior devices. The reduction of components leads to reduced processes in the manufacturing facility.

Outer cover 70 includes an outer annular rim 71 extending parallel to axis 15 and inwardly directed damper containing flange 72 extending in an inward direction toward axis 15. Inner cover 30 includes an inner annular rim 31 parallel to axis 15 and outwardly extending damper containing flange 32 extending in an outward direction away from axis 15. Inner cover 30 also includes a damper containing annular hump 34.

Inner tube 40 has an enlarged end 41, a reduced diameter portion 42 and a free distal end 43 as shown. End 41 and portion 42 also extend parallel to axis 15. Bellows 60 has one flange end 61 captured between enlarged end 41 and inner flange 33 of inner cover 30. Bellows 60 has another flange end 62 surrounded by inner flange 73 of outer cover 70.

Rims 31, 71, along with respective flanges 32, 72, and hump 34 define a pocket 51 which captures the annular-shaped damping member or cushion 50 in the position shown in the Figures and generally centrally of the opposite end extensions 61, 62 of bellows 60 convolutions. This central location is illustrated by the respective dimension X of the bellows 60 and the dimension X/2 between one end of a bellows 60 convolution and the center of damping cushion 50.

It will be noted that tube 40, in portions 42, 43, extend parallel to axis 15 but end 43 is not connected to end cover 70 or bellows 60. The end 41 of tube 40 extends along flange 33 of cover 30, sandwiching therebetween bellows flange 61.

Ultimately in use, end 41 of tube 40 will extend over and is connected to an end of pipe 12. Bellows flange 62 and flange 73, both parallel to axis 15, extend along and are secured to an end of pipe 14.

For example, pipe 12 may have an end abutting end 43 of inner tube 41 if desired. Nevertheless, the bellows 60 effectively seals the coupling across the ends of pipes 12, 14 so as to provide a preferably leak-tight coupling between pipes 12, 14.

It will be appreciated that the preferably metal bellows 60 is sufficiently flexible to accommodate torsional flex between tubes 12, 14, as well as relative bending motion therebetween. Moreover, damper 50 isolates and damps noise, vibration and harshness in the coupling system.

Compression rings (not shown) press or friction fit, or other well-known expedients are used to sealingly secure coupling 10 about ends of pipes 12, 14 as will be appreciated.

Any pivoting of the components of coupling 10 occurs at pocket 51 capturing damping element 50. Thus, both torsion and bending stress is centered at the damping element 50 and centrally of bellows 60 as will be appreciated, the respective rims 31, 71 and flanges 32, 72, acting oppositely on damping element 50.

The central location of damper 50 as noted with respect to the symmetric center of bellows 60 tends to dissipate concentration of stress and distribute it only uniformly and symmetrically along the bellows 60 during bending and torsional loads.

Accordingly, a shorter bellows for a desired stress dissipation parameter can be used as compared to prior bellows systems where the damper is not so oriented. Components and costs are both reduced.

Among others, one unique feature of the invention is thus the location of the damping element at the symmetric center of the bellows geometry. This allows for several benefits:

1) Even stress distribution during bending loads and resulting high durability).

2) Extremely short length for compact packaging requirements.

3) Reduced components and manufacturing processes when compared to other automotive exhaust joints.

These and other alternatives, modifications and advantages will become readily apparent to those of ordinary skill in the field to which this invention pertains and applicant intends to be bound only by the claims appended hereto.

What is claimed is:

1. A bellows coupling for exhaust system pipes and including:
   a convoluted bellows having convoluted portions between ends thereof for sealing the coupling against gas leakage;
   an inner cover;
   an outer cover;
   each of said covers having a rim extending therefrom, one of which rims is radially spaced from and overlaps the other rim; and
   an annular damper ring operably oriented radially around said convoluted portions of said bellows said damper ring captured between said radially spaced and overlapping rims radially outside said convoluted portions,
   said damper ring in direct contact with the rim of said outer cover and with the rim of said inner cover.

2. A coupling as in claim 1 further including:
   an elongated inner tube extending in one direction along an inner portion of said bellows from proximate one end thereof, said tube in direct engagement with one of said bellows ends.

3. A coupling as in claim 2 wherein said covers are free of direct engagement, one from the other.

4. A coupling as in claim 2 wherein said inner tube has an enlarged end with an internal diameter for receiving an exhaust tube therein and another end of relative reduced diameter.

5. A coupling as in claim 4 wherein one end of said bellows is captured between said inner cover and said enlarged end of said inner tube.

6. A coupling as in claim 5 wherein another end of said bellows is engaged and surrounded by a flange of said outer cover.

7. A method of coupling together respective proximate ends of two tubes in an exhaust system through a flexible coupling comprising the steps of:
   surrounding and sealing the distance between said two ends with a flexible bellows having convoluted portions;
   capturing an annular damper ring between respective radially spaced and overlapping rims of respective inner cover and an outer cover with said ring directly engaging surfaces of said respective rims; and
   dissipating forces applied by said tubes through said damper ring secured in said coupling substantially symmetrically located around and radially spaced from convoluted portions of said bellows by said overlapping rims.

8. A method as in claim 7 wherein said convoluted portion of said bellows has respective end convolutions, and including;
   sealing respective ends of said bellows to said respective inner and outer covers surrounding a rim of the inner cover with the rim of the outer cover; and
   capturing said damper ring between said respective rims at a position radially outwardly spaced from said convoluted portions of said bellows whereby said damper ring is disposed radially outside said convoluted portions and at a position which is an equal distance from respective convolutions at each end of the bellows.

9. A bellows as in claim 1 wherein said convoluted portion of said bellows comprise a convolution at each end of said portion, and wherein said damper ring is disposed midway between said end convolutions.

10. A coupling as in claim 1 wherein one of said overlapping rims is disposed radially inside said damper ring and another of said overlapping rims is disposed radially outside said damper ring, said damper ring disposed therebetween.

* * * * *